United States Patent [19]

Fujii

[11] 4,270,771
[45] Jun. 2, 1981

[54] HYDROPNEUMATIC SUSPENSION SYSTEM

[76] Inventor: Masayuki Fujii, No. 3-5, Kami-ohoka-nishi, Konan-ku, Yokohama City, Japan

[21] Appl. No.: 963,471

[22] Filed: Nov. 24, 1978

[30] Foreign Application Priority Data

Nov. 25, 1977 [JP] Japan .................... 52-140596

[51] Int. Cl.³ .................................... B60G 11/28
[52] U.S. Cl. ............................ 280/707; 267/65 D; 280/708
[58] Field of Search ............ 280/708, 707, 714, 6 R, 280/6.1; 267/65 D

[56] References Cited

U.S. PATENT DOCUMENTS

| 3,606,374 | 9/1971 | Capgras | 280/708 |
| 3,736,000 | 5/1973 | Capgras | 280/708 |

*Primary Examiner*—John J. Love
*Assistant Examiner*—John A. Carroll

[57] ABSTRACT

The hydropneumatic suspension system includes first and second pairs of suspension units; each pair of suspension units is adapted to be hydraulically controlled in the same manner. Each suspension unit includes upper and lower cylinder compartments divided by a main piston. The upper cylinder compartment and the lower cylinder compartment of each of the first pair of suspension units are respectively connected to the lower cylinder compartment and the upper cylinder compartment of each of the second pair of suspension units. Five solenoid valves are hydraulically connected to the suspension units and actuated, when it is required to lift a vehicle wheel, such that hydraulic fluid under pressure is supplied to the upper cylinder compartments of the first and second pairs of suspension units and thereafter hydraulic fluid in the upper cylinder compartments of one of the first and second pairs of suspension units is supplied to the lower cylinder compartments of the other pair.

5 Claims, 6 Drawing Figures

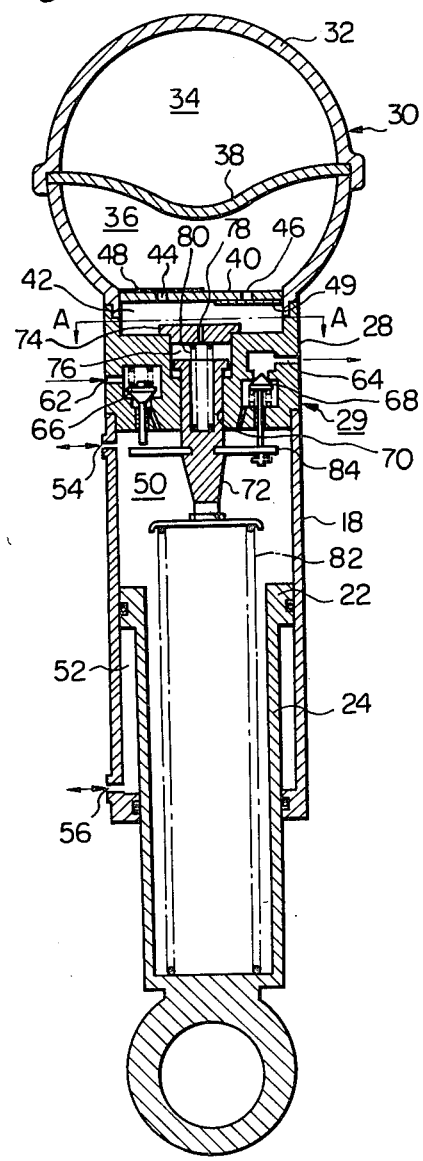
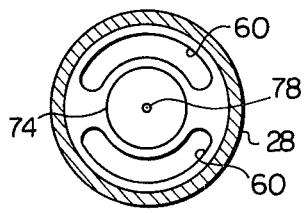
Fig. 2
Fig. 3

HYDROPNEUMATIC SUSPENSION SYSTEM

BACKGROUND OF THE INVENTION

This invention relates to hydropheumatic suspension systems for wheeled vehicles, especially four wheeled vehicles.

As is well known in the art, a hydropneumatic suspension system has a self-levelling or vehicle level adjusting function of maintaining the level of a vehicle body above the ground substantially constant independently of a load applied thereto, and this function makes it possible to give a soft springing of a vehicle, even in case of the vehicle which carries thereon a wide variety of loads, for thereby attaining a soft, cushioned ride.

However, in a vehicle equipped with such a hydropneumatic suspension system that is constructed to give a soft springing of the vehicle, a roll stiffness and a pitch stiffness of the vehicle becomes slightly smaller than required, which inevitably causes an appreciable side-roll of the vehicle body when the vehicle is under the conditions of making a turn and an appreciable fore-and-aft pitch of the vehicle body when the vehicle is under the accelerating or decelerating conditions, thus resulting in an uneasy feel of the passengers.

Also known in the art is a hydropneumatic suspension system of the type which is constructed to be able to lift a vehicle wheel above the ground, when required, through the operation of the suspension system of raising and lowering a vehicle body relative to the ground. This type of hydropneumatic suspension system is constructed in such a way as disclosed in, for example, U.S. Pat. No. 3,917,295.

In this prior art arrangement, a lift of a vehicle wheel is attained as follows: Firstly, the vehicle body is jacked up to its maximum level by supplying hydraulic fluid into the interiors of the suspensions units until the suspension units are put into their full-rebound conditions, i.e. the conditions in which the maximum extensible length of the suspension units is attained. Then, a suitable block is placed under the vehicle body so as to be located near the vehicle wheel to be lifted. After that, the hydraulic fluid in the suspension units is drained. Eventually, the vehicle wheel required is lifted by the action of an anti-roll bar disposed between the left and right suspension members and the effect of the tilt of the vehicle body. In this instance, it is an ordinary practice to determine the roll stiffness of the anti-roll bar according to the desired roll stiffness of the vehicle and the full-rebound stroke according to the desired riding comfort of the vehicle. In case that the full-rebound stroke is made longer than required for the riding comfort of the vehicle, the suspension units inevitably become of a considerable length and bulky, which is disadvantageous in view of a normal height of the vehicle body above the ground and arrangements of suspension elements.

For this reason, the method of lifting a vehicle wheel in the foregoing prior art arrangements cannot attain a sufficient lift of the vehicle wheel due to the lack of the full-rebound stroke of the suspension units and the stiffness of the anti-roll bar. This inconvenience is pronounced particularly in the case of a vehicle which is equipped with a suspension member of the type having a relative large unsprung weight, such as a rigid axle. In this case, though the lift of the vehicle wheel required can be attained to some extent under the conditions in which the tire of the vehicle wheel required to be lifted is not punctured, the lift of the vehicle wheel sufficient for tire replacement cannot be obtained in the case that a vehicle wheel with a punctured tire is to be lifted since the portion of the vehicle body where the vehicle wheel with a punctured tire is located remains lower than other portions of the vehicle body during jacking up of the vehicle body.

SUMMARY OF THE INVENTION

It is, therefore, an object of the present invention to provide a hydropneumatic suspension system for a wheeled vehicle which is free from the foregoing drawbacks of the prior art hydropneumatic suspension systems of the described type.

It is another object of the present invention to provide a hydropneumatic suspension system which is constructed to provide a sufficiently large lift of a vehicle wheel required without depending on the roll stiffness of an anti-roll bar and the effect of the tilt of the vehicle body.

It is a further object of the present invention to provide a hydropneumatic suspension system which is constructed so as to add a roll stiffness to a vehicle body when the vehicle is under the conditions of making a turn and add a pitch stiffness to a vehicle body when the vehicle is under the accelerating or decelerating conditions without deteriorating from a soft, cushioned ride.

BRIEF DESCRIPTION OF THE DRAWINGS

These and other objects and features of the present invention will be more apparent from the following description in conjunction with the accompanying drawings, in which:

FIG. 2 is an enlarged sectional view of a hydropneumatic suspension unit incorporated in the hydropneumatic suspension system of FIG. 1;

FIG. 3 is a sectional view taken generally along line A—A of FIG. 2;

DETAILED DESCRIPTION OF THE PREFERRED EMBODIMENTS

Figure 1:
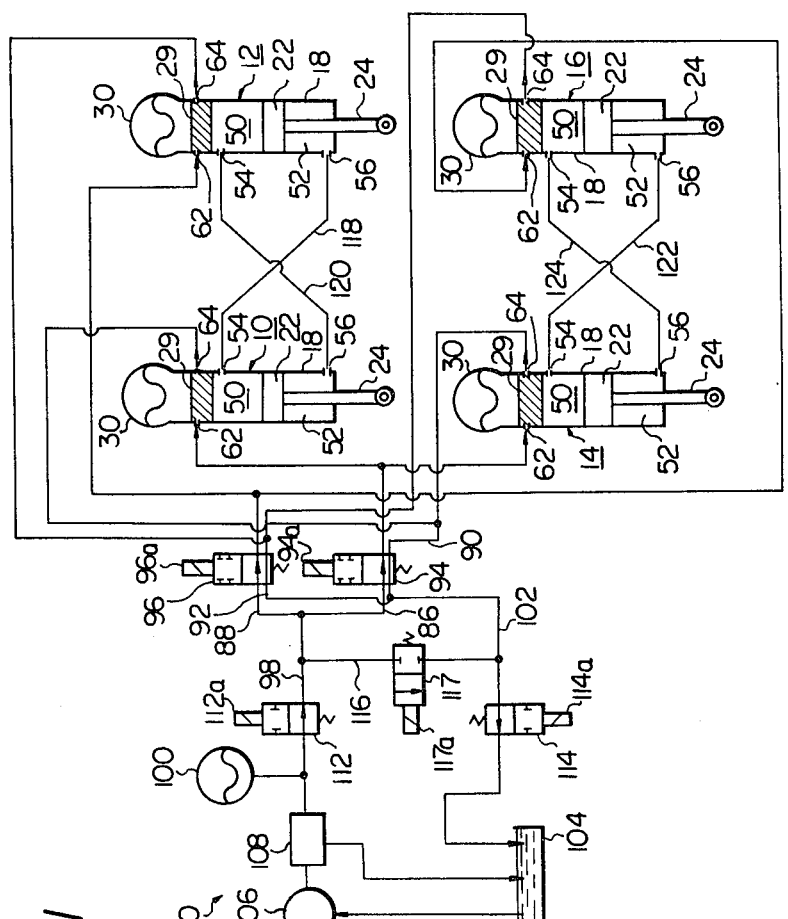
FIG. 1 is a schematic diagram of a first embodiment of a hydropneumatic suspension system according to the present invention.

Referring to FIG. 1, there is schematically shown a hydropneumatic suspension system for a wheeled vehicle embodying the present invention. In this embodiment illustrated, generally indicated by reference numeral 10 is a hydropneumatic suspension unit for a left front wheel of the vehicle, by 12 a hydropneumatic suspension unit for a right wheel, by 14 a hydropneumatic suspension unit for a left rear wheel and by 16 a hydropneumatic suspension unit for a right rear wheel, though the vehicle and its wheels are not shown. Each suspension unit is dipsosed between a body and a corresponding wheel supporting means, e.g. an axle of a wheel, of the vehicle.

The suspension units 10, 12, 14 and 16 are structurally the same and each of which has the structure depicted in FIGS. 2 and 3. Referring now to FIGS. 2 and 3, each suspension unit comprises a cylinder body 18 having a cylinder chamber 20 within which a main piston 22 is axially slidably accommodated. The main piston 18 has a piston rod 24, which extends outwardly of the cylinder body 18 and is formed with a mounting eye 26 at its lowermost end. The cylinder body 18 is shown as being secured at its upper end to a cylinder head 28 which has built therein a vehicle level adjusting valve assembly 29. To the cylinder head 28 is secured a gas spring or hydropneumatic spring device 30 which functions as a suspension spring. The hydropneumatic spring 30 comprises a casing 32 which is internally divided into separate chambers 34 and 36 by a flexible partition member 38 such as a diaphragm. The chamber 34 is totally closed by the flexible partition member 38 and is filled with a compressible gas such as a nitrogen gas under pressure. The other chamber 36 is partly defined by a flow restriction plate 40, which is secured to the casing 32, and is filled with hydraulic fluid. Between the flow restriction plate 40 and the cylinder head 28 is defined a hydraulic fluid chamber 42 which communicates with the chamber 36 through flow restriction passages 44 and 46 formed in the plate 40. As shown, the plate 40 has mounted on its upper and lower side surfaces one-way check valves 48 and 49 in the form of a reed valve, respectively. The one-way check valve 48 is operatively connected to the passage 44 in a way to allow fluid flow from the chamber 40 to the chamber 36 while the one-way check valve 49 is operatively connected to the passage 46 in a way to allow fluid flow in the reverse direction.

The main piston 22 divides the cylinder chamber 20 into upper and lower cylinder compartments 50 and 52 with which ports 54 and 56 formed in the cylinder body 18 communicate, respectively. The hydraulic fluid chamber 36 and the upper cylinder compartment 50 are intercommunicated through arcuate openings 60 (see FIG. 3) which are formed in the cylinder head 28 so as to extend axially throughout the length thereof.

The cylinder head 28 is formed with inlet and outlet ports 62 and 64 for the cylinder chamber 20 within which inlet and outlet valves 66 and 68 in the form of a poppet valve are respectively disposed in a manner to normally close the inlet and outlet ports 62 and 64. The inlet and outlet valves 66 and 68 constitute the aforesaid vehicle level adjusting valve assembly 29. The cylinder head 28 is further formed with a central bore 70 within which a floating piston or vehicle level sensing piston 72 is axially slidably received. Disposed above the piston 72 is a plug 74 which is screwed to the cylinder head 28. Between the plug 74 and the piston 72 is defined a hydraulic fluid chamber 76 which communicates with the chamber 42 through an orifice 78 formed in the plug 74. The vehicle level sensing piston 72 is supported at an equilibrium position by means of springs 80 and 82, of which the spring 80 is disposed between the plug 74 and the piston 72 and the spring 82 is disposed between the piston rod 24 and the piston 72. The piston 72 has secured thereto a valve actuating member 84 which extends radially of the piston 72. The valve actuating member 84 is operatively connected to the inlet and outlet valves 66 and 68 so as to alternatively push the valve 66 upwardly to open the inlet port 62 or pull the valve 68 downwardly to open the outlet port 64, as viewed in the drawing. The valve actuating member 84 is further operatively connected so as to make a lost motion before pushing or pulling the valve 66 or 68.

The suspension unit with the structure thus far described is mounted on a wheeled vehicle by connecting the cylinder body 18 to a vehicle body or a vehicle underbody structure and the piston rod 24 to a wheel supporting means such as an axle of a wheel, and operates as follows:

The road shocks received by the wheels of the vehicle cause the relative movement of the cylinder body 18 and the main piston 22. When this relative movement occurs, the one-way check valves 48 and 49 are alternatively opened so as to allow alternate fluid flow between the chambers 36 and 42 through the restricted flow passages 44 and 46. The road shocks are reduced or damped by the effect of the flow resistance provided by the passages 44 and 46 and the valves 48 and 49. The hydropneumatic spring device 30 also damps or absorbs and desorbs the road shocks. The suspension unit thus prevents the road shocks from being transmitted appreciably to the vehicle body.

When the vehicle body rises and falls away from a predetermined level above the ground in response to the variations of a load applied thereto, the vehicle level sensing piston 72 correspondingly moves upwardly or downwardly, which causes the valve actuating member 84 to open the inlet valve 66 or the outlet valve 68. As a result, hydraulic fluid under pressure is introduced into the cylinder chamber 20 through the inlet port 62 to lengthen the suspension unit, or hydraulic fluid in the cylinder chamber 20 is drained off therefrom through the outlet port 64 to shorten the suspension unit. The introduction or drainage of hydraulic fluid is continued until the predetermined vehicle level is attained. When the vehicle body is raised or lowered to the predetermined level, the vehicle level sensing piston 72 returns to its predetermined position where the inlet valve 66 or the outlet valve 68 closes by itself. The introduction or drainage of hydraulic fluid into or out of the cylinder chamber 22 is thus ended, and the vehicle body is maintained at the predetermined level. In this manner, the level of the vehicle body above the ground is maintained substantially constant independently of a load applied thereto.

The orifice 78 formed in the plug 74 restricts the fluid flow between the chambers 76 and 42. This is effective to prevent the vehicle level adjusting piston 72 from fluctuating in response to the bounces of the vehicle wheel due to the road shocks, whereby the useless reaction of the inlet and outlet valves 66 and 68 and therefore the useless consumption of the fluid pressure of a source of fluid under pressure are avoided.

Turning back to FIG. 1, the inlet and outlet ports 62 and 64 of the suspension units 10 and 14 for the left front and rear wheels are respectively connected to a common or first fluid supply conduit 86 and a common or first fluid drain conduit 88 while the inlet and outlet ports 62 and 64 of the suspension units 12 and 16 for the right left and rear wheels are respectively connected to a common or second fluid supply conduit 90 and a common or second fluid drain conduit 92. Disposed in the fluid supply and drain conduits 86 and 90 is a first normally open solenoid valve 94 which is operative to obstruct the fluid flow through the conduits 86 and 90 at the same time when actuated to close. Also disposed in the second fluid supply and drain conduits 88 and 92 is a second normally open solenoid valve 96 which is operative to obstruct the fluid flow through the conduits 88 and 92 at the same time when actuated to close.

The first and second fluid supply conduits 86 and 88 are hydraulically connected to a third fluid supply conduit 98 leading from an accumulator 100 while the first and second fluid drain conduits 90 and 92 are connected to a third fluid drain conduit 102 leading to a hydraulic fluid reservoir 104. The accumulator 100 and the reservoir 104 constitute, together with a hydraulic pump 106 and an unloader valve 108, a source of fluid under pressure 110. The pump 106 draws hydraulic fluid from the reservoir 104 and discharges hydraulic fluid under pressure into the fluid supply conduit 98 and the accumulator 100 by way of the unloader valve 108. The unloader valve 108 is operative to return hydraulic fluid under pressure from pump 106 to the reservoir 104 when the pressure of hydraulic fluid supplied thereto exceeds a predetermined value so as to maintain the pressure of hydraulic fluid in the interior of the accumulator 100 and that in the fluid supply conduit 98 at a predetermined value. In the third fluid supply conduit 98 is disposed a third normally open solenoid valve 112 which is operative to obstruct the fluid flow through the conduit 98 when actuated to close while in the third fluid drain conduit 102 is disposed a fourth normally open solenoid valve 114 which is operative to obstruct the fluid flow through the conduit 102 when actuated to close. As shown, the fluid supply conduit 98 and the fluid drain conduit 102 are hydraulically interconnected by a fluid conduit or a shunt passageway 116 in such a manner that the junction between the conduits 98 and 116 is located downstream of the solenoid valve 112 while the junction between the conduits 102 and 116 is located upstream of the solenoid valve 114. In the conduit 116 is disposed a normally closed solenoid valve 117 which is operative to allow fluid flow through the conduit 116 when actuated to open.

A pair of fluid conduits 118 and 120 is provided which hydraulically interconnect the port 54 of each of the suspension units 10 and 12 for the left and right front wheels to the port 56 of the other of same. A pair of fluid conduits 122 and 124 is also provided which hydraulically interconnect the port 54 of each of the suspension units 14 and 16 for the left and right rear wheels to the port 56 of the other of same.

The operation of the hydropneumatic suspension system of this invention thus far described will now be described.

The suspension system is shown in FIG. 1 in an operative condition into which it is put when the vehicle is travelling and in which the solenoid valves 94, 96, 112, 114 and 116 are held in their quiescent or normal operative positions, respectively. In this condition, the regulated fluid pressure from the source 110 is kept supplied to the inlet ports 62 of the suspension units 10 and 14 by way of the solenoid valves 112 and 94 and also supplied to the inlet ports 62 of the suspension units 12 and 16 by way of the solenoid valves 112 and 96. The outlet ports 64 of the suspension units 10 and 14 on the other hand, communicate with the reservoir 104 by way of the solenoid valves 94 and 114, while the outlet ports 64 of the suspension units 12 and 16 communicate with the reservoir 104 by way of the solenoid valves 96 and 114. The suspension units 10, 12, 14 and 16 thus hydraulically connected to the source 110 and the reservoir 104 can exercise their vehicle level adjusting function of maintaining the level of the vehicle body above the ground substantially constant by the aforesaid action of the vehicle adjusting valve assembly 29.

In this case, when the vehicle makes a sharp turn, the suspension units on the side of the vehicle farthest from the center of the turn, for example the suspension units 12 and 16 are compressed with the result that the main pistons 22 thereof move upwardly and accordingly the fluid pressure in the cylinder compartments 50 thereof rises. A certain amount of the hydraulic fluid in the upper cylinder compartments 50 of the suspension units 12 and 16 is thus discharged into the lower cylinder compartments 52 of the suspension units 10 and 14 through the conduits 120 and 124, while the hydraulic fluid in the upper cylinder compartments 50 of the suspension units 10 and 14 is discharged, by the amount corresponding to the amount supplied to the lower cylinder compartment 52 thereof, into the lower cylinder compartments 52 of the suspension units 12 and 16 through the conduits 118 and 122. Thus, when the suspension units on one side of the vehicle, for example the suspension units 12 and 16 are compressed and shortened when the vehicle makes a turn, the suspension units on the other side of the vehicle, for example the suspension units 10 and 14 are also shortened. The suspension system, in this manner, can damp or reduce the roll of the vehicle body when the vehicle makes a sharp turn.

When it is required to jack up the vehicle body, the operator of the vehicle operates a solenoid control unit (not shown) such that the solenoids 114a and 117a of the solenoid valves 114 and 117 are energized. Thereupon, the solenoid valve 114 is actuated to be closed while the solenoid valve 117 is actuated to open. The source 110 thereby supplies hydraulic fluid under pressure to the outlet ports 64 of the suspension units 10, 12, 14 and 16 by way of the solenoid valves 112 and 117, the conduit 102, the solenoid valves 94 and 96 and the conduits 90 and 92. The outlet port 64 of each suspension unit is caused to open by the fluid pressure supplied thereto. The hydraulic under pressure is thereby introduced into each upper cylinder compartment 50 with the result that each suspension unit is lengthened and accordingly the vehicle body is jacked up or raised relative to the ground. When the vehicle body is raised to a maximum level (the level which is attained when the suspension units are of the maximum extensible length), or when the vehicle body is raised to the level slightly higher than a block to be placed under the vehicle body, the operator of the vehicle operates the solenoid control unit such that the solenoid 112a of the solenoid valve 112 is energized additionally. Thereupon, the solenoid 112 is actuated to be closed with the result that the above supply of hydraulic fluid to the outlet port 64 of each suspension unit is stopped.

The vehicle body is thus maintained at the above jacked up level. In this condition, underbody repairs are facilitated without the need of a supplementary jack. If a vehicle wheel is to be lifted above the ground, the block is placed under the vehicle body on its side where the vehicle wheel to be lifted is located. After that, the solenoid control unit is operated such that the solenoid 94a of the solenoid valve 94 is energized. Thereupon, the solenoid valve 94 is actuated to be closed. Then, the solenoid control unit is further operated such that the solenoid 114a of the solenoid valve 114 is de-energized. The solenoid valve 114 is thus actuated to be open. In this condition of the suspension system, the inlet ports 62 of the suspension units 12 and 16 communicate with the reservoir 104 by way of the conduit 88, the solenoid valve 96, the conduit 116, the solenoid valve 117 and the solenoid valve 114, while the outlet ports 64 of the suspension units 12 and 16 also communicate with the reservoir 104 by way of the conduit 92, the solenoid valve 96, the conduit 102 and the solenoid valve 114. The hydraulic fluid in the upper cylinder compartments 50 of the suspension units 12 and 16 is thus drained through both the inlet and outlet ports 62 and 64 thereof, being propelled by the fluid pressure in the upper cylinder compartments 50. During this drainage, the hydraulic fluid in the upper cylinder compartments 50 of the suspension units 10 and 14 is supplied to the lower cylinder compartments 52 of the suspension units 12 and 16, while the hydraulic fluid in the upper cylinder compartments 50 of the suspension units 12 and 16 flows into the lower cylinder compartments 52 of the suspension units 10 and 14. The suspension units 10, 12, 14 and 16 thus contract substantially at the same rate. When the vehicle body is lowered and abuts onto the block, the fluid pressure in the cylinder chambers 22 of the suspension units 12 and 16 disappears, whereas the fluid pressure still exists in the upper cylinder compartments 50 of the suspension units 10 and 14 since the suspension units 10 and 14 support part of the weight of the vehicle body and the upper cylinder compartments 50 thereof are prevented from being drained. The fluid pressure in the upper cylinder compartments 50 of the suspension units 10 and 14 is applied into the lower cylinder compartments 52 of the suspension units 12 and 16 through the conduits 118 and 122. The piston rods 24 of the suspension units 12 and 16 are thus caused to be drawn into the cylinder body 18, i.e. the suspension units 12 and 16 are caused to contract. In this case, a large amount of contraction of the suspension units 12 and 16 is effected by a small amount of contraction of the suspension units 10 and 14 by the effect of the difference in the pressure acting area between the upper and lower sides of the main piston 20. The left front and rear wheels operatively connected to the suspension units 12 and 16 thus can be lifted sufficiently high above the ground without depending on the stiffness of the anti-roll bar of the vehicle and the tilt of the vehicle body.

If a vehicle wheel on the opposite side (left side) of the vehicle body is to be lifted, this achieved in the similar manner as above with the exception that the step of energizing the solenoid 94a of the solenoid valve 94 is replaced by the step of energizing the solenoid 96a of the solenoid valve 96.

In order to lower the vehicle body for the travelling of the vehicle after the lifting of the vehicle wheel, the suspension units 10, 12, 14 and 16 are hydraulically controlled so as to extend again by means of aforesaid jack-up operation. After that, the block having been placed under the vehicle body is removed therefrom, and the solenoid control unit is operated such that all of the solenoid valves are conditioned to be in their operative positions as shown in FIG. 1. With this, the level of the vehicle body is returned to the normal level by the action of the vehicle level adjusting valve assembly 29. The vehicle is thus ready for motion or travelling.

In the embodiment of the hydropneumatic suspension system thus far described, the port 54 of each of the suspension units 10 and 12 for the left and right front wheels is hydraulically connected to the port 56 of the other of same while the port 54 of each of the suspension units 14 and 16 for the left and right rear wheels is hydraulically connected to the port 56 of the other of same. This can be replaced by the arrangement that the port 54 of each of the suspension units 10 and 14 for the left front and right rear wheels is hydraulically connected to the port 56 of the other of same while the port 54 of each of the suspension units 12 and 16 for the right front and left rear wheels is hydraulically connected to the port 56 of same. This modified arrangement not only produces the same effect as the arrangement illustrated but also is effective to prevent the forward and rearward tilts of the vehicle body upon acceleration or deceleration of the vehicle so as to add pitch stability to the vehicle.

Figure 4:
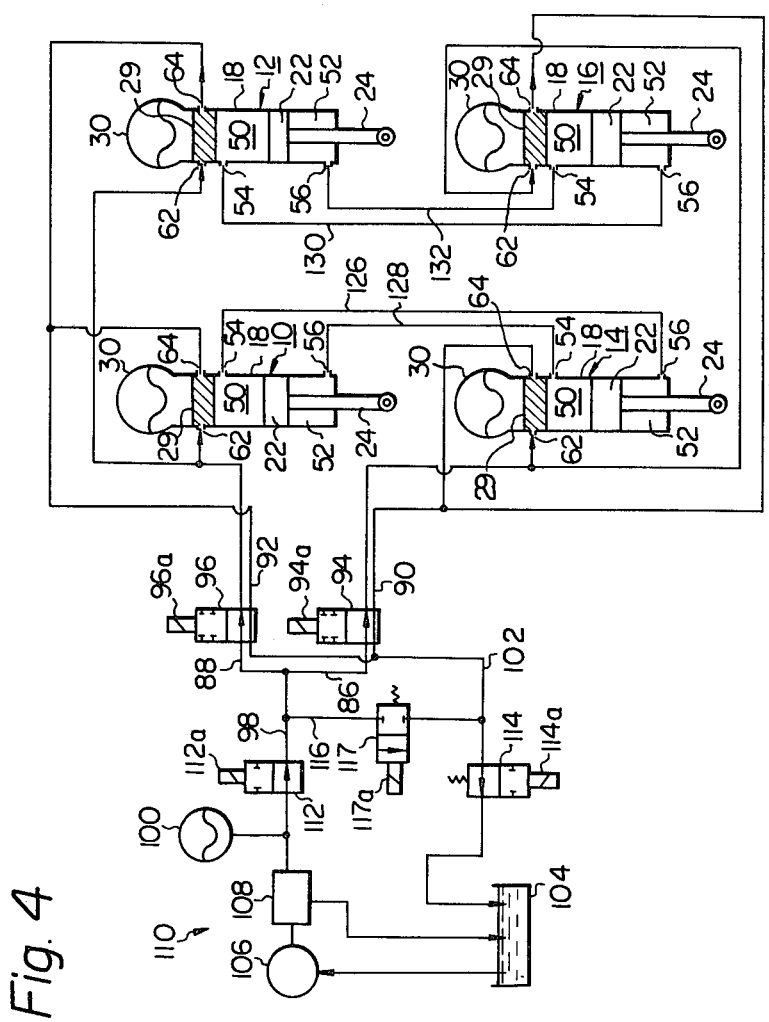
FIGS. 4 to 6 are schematic diagrams of second to fourth embodiments of the hydropneumatic suspension system according to the present invention, respectively.

FIG. 4 shows a second embodiment of the hydropneumatic suspension system according to the present invention, in which like parts to the first embodiment of FIG. 1 are given same reference numerals and will not be described again to avoid useless repetition.

In the second embodiment of FIG. 4, the fluid supply conduit 86 is hydraulically connected to the inlet ports 62 of the suspension units 14 and 16 for the left and right rear wheels, while the fluid supply conduit 88 is hydraulically connected to the inlet ports 62 of the suspension units 10 and 12 for the left and right front wheels. The fluid drain conduit 90 is hydraulically connected to the outlet ports 64 of the suspension units 14 and 16 for the left and right rear wheels, while the fluid drain conduit 92 is hydraulically connected to the outlet ports 64 of the suspension units 10 and 12 for the left and right front wheels.

A pair of conduits 126 and 128 is provided which hydraulically interconnects the port 54 of each of the suspension units 10 and 14 for the left front and rear wheels to the port 56 of the other of same. A pair of conduits 130 and 132 is also provided which hydraulically interconnects the port 54 of each of the suspension units 12 and 16 for the right and rear wheels to the port 56 of the other of same.

The second embodiment of the suspension system according to the present invention operates as follows:

The second embodiment of the suspension system is shown in FIG. 4 in an operative condition into which it is put when the vehicle is travelling and in which the solenoid valves 94, 96, 112, 114 and 116 are conditioned to take their quiescent or normal operative positions, respectively. In this condition, the regulated fluid pressure from the source 110 is kept supplied to the inlet ports 62 of the suspension units 14 and 16 by way of the solenoid valves 112 and 94 and also supplied to the inlet ports 62 of the suspension units 10 and 12 by way of the solenoid valves 112 and 96. The outlet ports 64 of the suspension units 14 and 16, on the other hand, communicate with the reservoir 104 by way of the solenoid valves 94 and 114, while the outlet ports 64 of the suspension units 10 and 12 communicate with the reservoir 104 by way of the solenoid valves 96 and 114. The suspension units 10, 12, 14 and 16 thus hydraulically connected to the source 110 and the reservoir 104 can exercise their vehicle level adjusting function of maintaining the level of the vehicle body above the ground substantially constant by the aforesaid action of the vehicle level adjusting valve assembly 29.

In this case, when the vehicle is accelerated or decelerated, the suspension units 14 and 16 for the rear wheels or the suspension units 10 and 12 for the front wheels are compressed with the result that the main pistons 22 thereof move upwardly and accordingly the fluid pressure in the upper cylinder compartments 50 thereof rises. A certain amount of the hydraulic fluid in the upper cylinder compartments 50 of the suspension units 14 and 16 or the suspension units 10 and 12 is thus discharged into the lower cylinder compartments 52 of the suspension units 10 and 12 or the suspension units 14 and 16 through the conduits 128 and 132 or the conduits 126 and 128, while the hydraulic fluid in the upper cylinder compartments 50 of the suspension units 10 and 12 or the suspension units 14 and 16 is discharged, by the amount corresponding to the amount supplied to the lower cylinder compartments 52 thereof, into the lower cylinder compartments 52 of the suspension units 14 and 16 or the suspension units 10 and 12 through the conduits 126 and 130 or the conduits 128 and 132. Thus, when the suspension units 14 and 16 or the suspension units 10 and 12 are compressed and shortened upon acceralation or deceleration of the vehicle, the suspension units 10 and 12 or the suspension units 14 and 16 are also shortened. The suspension system, in this manner, can damp or reduce the forward tilt or backward tilt of the vehicle body upon the acceleration or deceleration of the vehicle.

When it is required to jack up the vehicle body, the solenoid control unit is operated such that the solenoids 114a and 117a of the solenoid valves 114 and 117 are energized. Thereupon, the solenoid valve 114 is actuated to be closed, while the solenoid valve 117 is actuated to be open. The source 110 thereby supplies hydraulic fluid under pressure to the outlet ports 64 of the suspension units 10, 12, 14 and 16 by way of the solenoid valves 112 and 117, the conduit 102, the solenoid valves 94 and 96 and the conduits 90 and 92. The outlet port 64 of each suspension unit is caused to open by the fluid pressure supplied thereto. The hydraulic fluid under pressure is thereby introduced into each upper cylinder compartment 50 with the result that each suspension unit is lengthened and accordingly the vehicle body is jacked up or raised to a maximum level (the level which is attained when the suspension units are of the maximum extensible length), or when the vehicle body is raised to the level slightly higher than a block to be placed under the vehicle body, the solenoid control unit is operated such that the solenoid 112a of the solenoid valve 112 is energized additionally. Thereupon, the solenoid valve 112 is actuated to be closed with the result that the above supply of hydraulic fluid to the outlet port 64 of each suspension unit is stopped.

The vehicle body is thus maintained at the above jacked up level. In this condition, underbody repairs are facilitated without the need of a supplementary jack. If a vehicle wheel, for example the front wheel, is to be lifted above the ground, the block is placed under the vehicle body on the side, for example the front side, where the vehicle wheel to be lifted is located. After that, the solenoid control unit is operated such that the solenoid 94a of the solenoid valve 94 is energized. Thereupon, the solenoid valve 94 is actuated to be closed. Then, the solenoid control unit is further operated such that the solenoid 114a of the solenoid valve 114 is de-energized. In the condition of the suspension system with the solenoid valves actuated as above, the inlet ports 62 of the suspension units 10 and 12 communicate with the reservoir 104 by way of the conduit 88, the solenoid valve 96, the conduit 116, the solenoid valve 117 and the solenoid valve 114, while the outlet ports 64 of the suspension units 10 and 12 also communicate with the reservoir 104 by way of the conduit 92, the solenoid valve 96, the conduit 102 and the solenoid valve 114. The hydraulic fluid in the upper cylinder compartments 50 of the suspension units 10 and 12 is thus drained through both the inlet and outlet ports 62 and 64 thereof, being propelled by the fluid pressure in the upper cylinder compartments 50. During this drainage, the hydraulic fluid in the upper cylinder compartments 50 of the suspension units 14 and 16 flows into the lower cylinder compartments 52 of the suspension units 10 and 12, while the hydraulic fluid in the upper cylinder compartments 50 of the suspension units 10 and 12 flows into the lower cylinder compartments 52 of the suspension units 14 and 16. The suspension units 10, 12, 14 and 16 thus contract substantially at the same rate. When the vehicle body is lowered and abuts onto the block, the fluid pressure in the upper cylinder compartments 50 of the suspension units 10 and 12 disappears, whereas the fluid pressure still exists in the upper cylinder compartments 50 of the suspension units 14 and 16 since the suspension units 14 and 16 supports part of the weight of the vehicle body and the upper cylinder compartments 50 thereof are prevented from being drained. The fluid pressure in the upper cylinder compartments 50 of the suspension units 14 and 16 is applied into the lower cylinder compartments 52 of the suspension units 10 and 12 through the conduits 128 and 132. The piston rods 24 of the suspension units 10 and 12 are thus caused to be drawn into the cylinder body 18, i.e. the suspension units 10 and 12 are caused to contract. In this case, a large amount of contraction of the suspension units 10 and 12 is caused by a small amount of the suspension units 14 and 16 by the effect of the difference in the pressure acting area between the upper and lower sides of the main piston 20. The front wheels operatively connected to the suspension units 10 and 12 thus can be lifted sufficiently above the ground without depending on the stiffness of the anti-roll bar of the vehicle and the tilt of the vehicle body.

If a vehicle wheel on the opposite side (rear side) of the vehicle body is to be lifted, this is achieved in the similar manner as above with the exception that the step of energizing the solenoid 94a of the solenoid 94 is replaced by the step of energizing the solenoid 96a of the solenoid valve 96.

In order to lower the vehicle body for the travelling of the vehicle after the lifting of the vehicle wheel, the suspension units 10, 12, 14 and 16 are hydraulically controlled so as to extend again by means of the aforesaid jack-up operation. After that, the block having been placed under the vehicle body is removed therefrom, and the solenoid control unit is operated such that all of the suspension units are conditioned to be in their operative positions as shown in FIG. 4. With this, the level of the vehicle body is returned to the normal level by the action of the vehicle level adjusting valve assembly 29. The vehicle is thus ready for motion or travelling.

Figure 5:
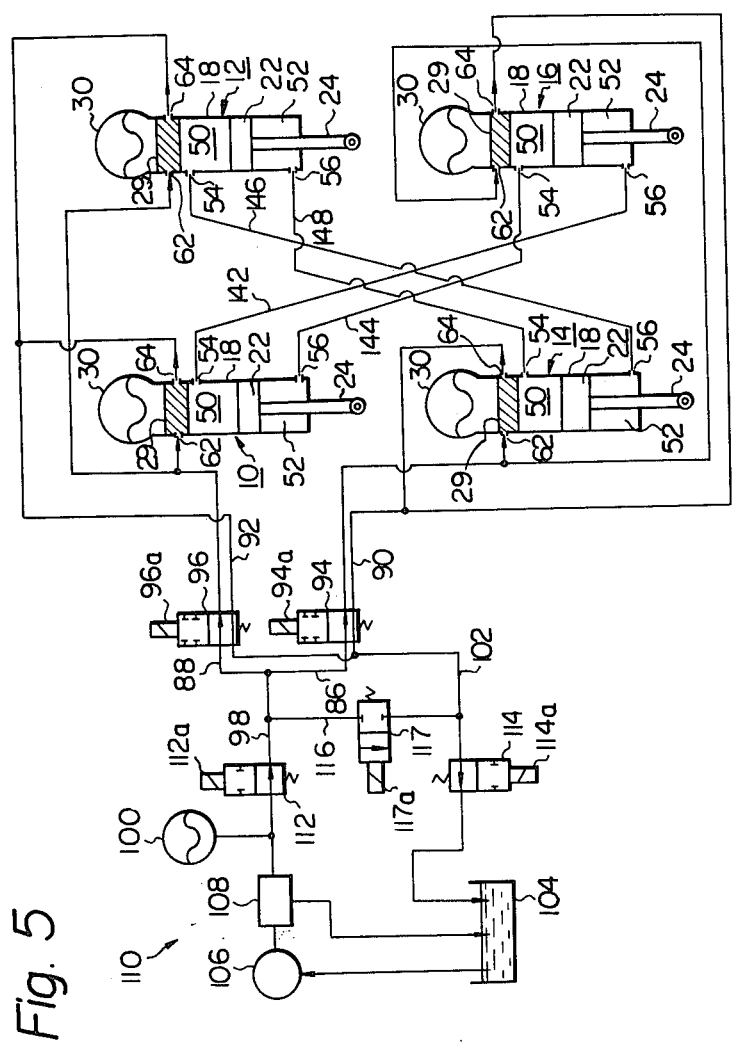

Referring now to FIG. 5, there is shown the third embodiment of the hydropneumatic suspension system according to the present invention. In this embodiment of FIG. 5, like parts to the first embodiment of FIGS. 1 to 3 are given same reference numerals and will not be described again the avoid useless repetition.

The embodiment of FIG. 5 is substantially similar to the embodiment of FIG. 4 with the exception that the suspension unit 10 for the left front wheel and the suspension unit 16 for the right rear wheel, which are diagonally located on the vehicle body, are hydraulically interconnected by a pair of conduits 142 and 144, while the suspension unit 12 for the right front wheel and the suspension unit 14 for the left rear wheel, which are diagonally located on the vehicle body, are hydraulically interconnected by a pair of conduits 146 and 148. That is, the port 54 of each of the suspension units 10 and 16 is interconnected to the port 56 of the other of the suspension units 10 and 16, while the port 54 of each of the suspension units 12 and 14 is interconnected to the other of the suspension units 12 and 14.

The third embodiment of FIG. 5 produces substantially the same effect as the second embodiment of FIG. 4 with the exception that it can effect not only the reduction in the pitch of the vehicle body upon acceleration or decleration of the vehicle but also the reduction in the roll of the vehicle body upon turning of the vehicle.

In the foregoing embodiments of the hydropneumatic suspension system of this invention, there are shown two types of arrangements for coupling the suspension units 10, 12, 14 and 16 into two pairs so that the suspension units paired communicate with the source and the reservoir in the same manner. That is, one type of arrangement is that the suspension units 10 and 16 and the suspension units 12 and 14 are respectively paired as in the first embodiment of FIG. 1 and the other type of arrangements is that the suspension units 10 and 12 and the suspension units 14 and 16 are respectively paired as in the second and third embodiments of FIGS. 4 and 5. In place of the above two types, another type of arrangement as shown in FIG. 6 is available for the hydropneumatic suspension system of this invention.

Figure 6:
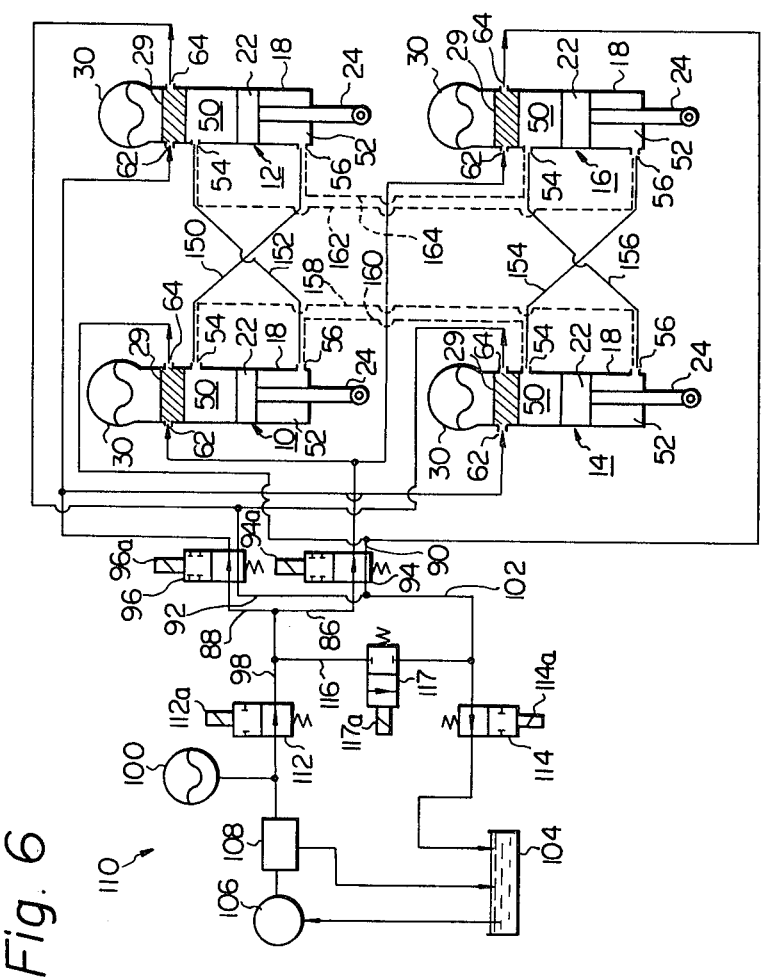

In FIG. 6, there is shown a fourth embodiment of a hydropneumatic suspension system according to the present invention. In this embodiment of FIG. 6, like parts to the first embodiments of FIG. 1 are given the same reference numerals and will not be described again to avoid useless repetition.

The fourth embodiment of FIG. 6 is constructed substantially the same as the first embodiment of FIG. 1 with the exception that the port 54 of each of the suspension units 10 and 12 is interconnected to the port 56 of the other of the suspension units 10 and 12 while the port 54 of each of the suspension units 14 and 16 is interconnected to the port 56 of the other of the suspension units 14 and 16. With the conduits thus arranged, the fourth embodiment effects the reduction of the roll of the vehicle body upon turning of the vehicle similarly as the first embodiment of FIG. 1. The fourth embodiment effects lifting of a vehicle wheel desired as follows:

The suspension units 10, 12, 14 and 16 are lengthened by supplying thereinto fluid under pressure through the outlet ports 64 in the same manner as has been explained with respect to the foregoing embodiments of this invention. After the suspension units have been lengthened and accordingly the vehicle body has been jacked up, fluid in the upper cylinder compartments 50 of one pair of suspension units, for example the suspension units 12 and 14, is drained with the result that the suspension units 12 and 14 contract and therefore the right front and left rear wheels are lifted while being supported by the left front and right rear wheels connected by the other pair of suspension units 10 and 16.

The vehicle body thus turns on the suspension units 10 and 16 and inclines toward the side of the vehicle body where a larger portion of the weight of the vehicle body exists, for example the forward side of the vehicle with the result the rear wheel connected by the suspension unit 14 is lifted high above the ground.

In this condition, the sunken side of the vehicle body, i.e. the forward side of the vehicle body, can be lifted easily through a manual effort with the result that the front wheel connected by the suspension unit 12 is lifted and can be maintained at the lifted position by means of a block to be placed under the vehicle body.

In order to return the vehicle body from the above condition to the normal condition in which the vehicle is ready for motion, all that is necessary is only to remove the block under the vehicle body therefrom and to put all of the solenoid valves into normal or quiescent conditions, which can omit the step of jacking up the vehicle body.

In this fourth embodiment, the conduits 150 to 156 can be replaced by conduits 158 to 164, as shown by the dotted lines. That is, the port 54 of each of the suspension units 10 and 14 is interconnected to the port 56 of the other of the suspension units 12 and 16 through the conduits 158 and 160, while the port 54 of each of the suspension units 12 and 16 is interconnected to the port 56 of the other of the suspension units 12 and 16 through the conduits 162 and 164. With the conduits thus arranged, the embodiment of FIG. 6 can produce an effect of reducing the pitch of the vehicle body, that is to say, add pitch stiffness to the vehicle body.

From the foregoing description, it will be understood that the hydropneumatic suspension system according to the present invention is constructed such that it can provide a sufficiently large lift of a vehicle wheel required without depending on the roll stiffness of an anti-roll bar and the effect of the tilt of a vehicle body.

From the foregoing description, it will be further understood that the hydropneumatic suspension system according to the present invention is constructed such that it can provide a sufficiently large lift of a vehicle wheel with suspension units of which the maximum extensible length is relatively short.

From the foregoing description, it will be yet further understood that the hydropneumatic suspension system according to the present invention can provide a lift of a vehicle wheel sufficient for a tire replacement without requiring suspension units to be extended maximumly whereby the wheel lifting operation can be finished in a relatively short time.

From the foregoing description, it will be yet further understood that the hydropneumatic suspension system according to the present invention is constructed such that it can provide a lift of two wheels, for example left front and rear wheels, right front and rear wheels, front wheels or rear wheels, at the same time whereby in case of, for example a tire rotation the necessary jack-up operations can be reduced in number and accordingly the whole operation can be finished in a short time.

From the foregoing description, it will be yet further understood that the hydropneumatic suspension system according to the present invention is constructed such that it can add a roll stiffness to a vehicle body when the vehicle is under the conditions of making a turn and also add a pitch stiffness to a vehicle body when the vehicle is under the accelerating or decelerating conditions without deteriorating from a soft, cushioned ride.

What is claimed is:

1. A hydropneumatic suspension system for a wheeled vehicle comprising:
   a source of hydraulic fluid under pressure;
   a hydraulic fluid reservoir;
   first and second pairs of hydropneumatic suspension units disposed between a body and wheel supporting means of the vehicle, each of said suspension units including a cylinder body having a cylinder chamber, a piston slidably accommodated in the cylinder chamber and dividing the cylinder chamber into upper and lower cylinder compartments and self-levelling valve means operative to alternatively communicate said source and said reservoir to said upper cylinder compartment through inlet and outlet ports of the suspension units for thereby maintaining the level of the vehicle body above the ground substantially constant;

a first pair of conduits, one of which interconnects the upper cylinder compartment of one of said first pair of suspension units and the lower cylinder compartment of one of said second pair of suspension units and the other of which interconnects the upper cylinder compartment of said one of said second pair of suspension units and the lower cylinder compartment of said one of said first pair of suspension units;

a second pair of conduits, one of which interconnects the upper cylinder compartment of the other of said first pair of suspension units and the lower cylinder compartment of the other of said second pair of suspension units and the other of which interconnects the upper cylinder compartment of said other of said second pair of suspension units and the lower cylinder compartment of said other of said first pair of suspension units;

a first fluid supply passageway communicating with the inlet ports of said first pair of suspension units;

a second fluid supply passageway communicating with the inlet ports of said second pair of suspension units;

a third fluid supply passageway hydraulically connecting said first and second fluid supply passageways to said source;

a first drain passageway communicating with the outlet ports of said first pair of suspension units;

a second drain passageway communicating with the outlet ports of said second pair of suspension units;

a third drain passageway hydraulically connecting said first and second drain passageways to said reservoir;

first electrically controlled normally open valve means disposed in said first fluid supply and drain passageways and operative to obstruct fluid flow through said first fluid supply and drain passageways when actuated to close;

second electrically controlled normally open valve means disposed in said second fluid supply and drain passageways and operative to obstruct fluid flow through said second fluid supply and drain passageways when actuated to close;

third electrically controlled normally open valve means disposed in said third fluid supply passageway and operative to obstruct communication between said source and said first and second fluid supply passageways when actuated to close;

fourth electrically controlled normally open valve means disposed in said third drain passageway and operative to obstruct communication between said reservoir and said first and second drain passageway when actuated to close;

a shunt passageway interconnecting said third fluid supply passageway and said third drain passageway in such a manner that the junction between said shunt passageway and said third fluid supply is located upstream of said third valve means and that the junction between said shunt passageway and said third drain passageway is located downstream of said fourth valve means;

electrically controlled normally closed valve means disposed in said shunt passageway and operative to allow fluid flow through said shunt passageway when actuated to open; and in which said electrically controlled valve means are actuated such that hydraulic fluid under pressure is supplied to the upper cylinder compartments of the first and second pairs of suspension units through the outlet ports thereof from said source and thereafter hydraulic fluid in the upper cylinder compartments of one of the first and second pairs of suspension units is supplied to the lower cylinder compartments of the other pair.

2. A hydropneumatic suspension system as claimed in claim 1, in which said first pair of suspension units are operatively connected to left and right front wheels of the vehicle, respectively and said second pair of suspension units are operatively connected to left and right rear wheels, respectively.

3. A hydropneumatic suspension system as claimed in claim 1, in which said first pair of suspension units are operatively connected to left front and rear wheels of the vehicle, respectively and said second pair of suspension units are operatively connected to right front and rear wheels of the vehicle, respectively.

4. A hydropneumatic suspension system as claimed in claim 1, in which said first pair of suspension units are operatively connected to left front and right rear wheels of the vehicle, respectively and said second pair of suspension units are operatively connected to right front and left rear wheels of the vehicle, respectively.

5. A hydropneumatic suspension system as claimed in claim 1, in which said first, second, third and fourth electrically controlled normally open valve means comprise normally open solenoid valves, respectively and said electrically controlled normally closed valve means comprise a normally closed solenoid valve.

* * * * *

UNITED STATES PATENT AND TRADEMARK OFFICE
CERTIFICATE OF CORRECTION

PATENT NO. : 4,270,771
DATED : June 2, 1981
INVENTOR(S) : MASAYUKI FUJII

It is certified that error appears in the above—identified patent and that said Letters Patent is hereby corrected as shown below:

On the title page Insert:

-- Assignee: Nissan Motor Company, Limited; Yokohama, Japan --

Signed and Sealed this

Twenty-ninth Day of September 1981

[SEAL]

Attest:

GERALD J. MOSSINGHOFF

Attesting Officer

Commissioner of Patents and Trademarks